(12) United States Patent
Yang et al.

(10) Patent No.: US 10,760,526 B2
(45) Date of Patent: Sep. 1, 2020

(54) PISTON FOR INTERNAL COMBUSTION ENGINE

(71) Applicant: DONG YANG PISTON CO., LTD., Gyeonggi-do (KR)

(72) Inventors: Jun Kui Yang, Seoul (KR); Kwan Ho Ryu, Gyeonggi-do (KR); Sang Hyuk Jun, Gyeonggi-do (KR); Woo Seok Shim, Gyeonggi-do (KR); In Cheol Yoo, Gyeonggi-do (KR); Jang Ik Park, Gyeonggi-do (KR)

(73) Assignee: DONG YANG PISTON CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/245,452

(22) Filed: Jan. 11, 2019

(65) Prior Publication Data
US 2019/0218997 A1   Jul. 18, 2019

(30) Foreign Application Priority Data
Jan. 12, 2018  (KR) .................. 10-2018-0004447

(51) Int. Cl.
*F02F 3/22*  (2006.01)
*F01P 3/10*  (2006.01)
*F16J 9/22*  (2006.01)

(52) U.S. Cl.
CPC ............... *F02F 3/22* (2013.01); *F01P 3/10* (2013.01); *F02F 2200/06* (2013.01); *F16J 9/22* (2013.01)

(58) Field of Classification Search
CPC ... F02F 3/22; F02F 2200/06; F01P 3/10; F16J 9/22
See application file for complete search history.

(56) References Cited

FOREIGN PATENT DOCUMENTS

| | | |
|---|---|---|
| CN | 201198794 | 2/2009 |
| CN | 103184951 | 7/2013 |
| DE | 102011081639 | 2/2013 |
| DE | 102015214512 | 2/2017 |
| DE | 102015214512 A1 * | 2/2017 ............... F02F 3/22 |
| JP | 0658201 | 3/1994 |
| JP | 2001-304040 A | 10/2001 |
| JP | 2003-138984 A | 5/2003 |
| JP | 2005048650 | 2/2005 |
| JP | 3210638 | 6/2017 |
| JP | 3210638 A * | 6/2017 |

* cited by examiner

*Primary Examiner* — Jacob M Amick
*Assistant Examiner* — Charles Brauch
(74) *Attorney, Agent, or Firm* — Stuart H. Mayer; Mayer & Williams PC

(57) ABSTRACT

Provided is a piston for an internal combustion engine. The piston includes a body including, at an upper part of the body, a crown including a combustion chamber where fuel is burnt and including, at a lower part of the body, a piston pin boss into which a piston pin is inserted and a skirt corresponding to a cylinder wall, and a cooling channel including a refrigerant channel, a refrigerant inlet provided at a side of the refrigerant channel, and a refrigerant outlet provided at the other side of the refrigerant channel, wherein a cross section of the cooling channel has an overall elliptic shape to reduce stress occurring at an upper side of the cooling channel when the fuel is burnt in the internal combustion engine, and at least one of arcs of the ellipse is configured as a first elliptical arc of a quadratic curve.

10 Claims, 9 Drawing Sheets

PISTON FOR INTERNAL COMBUSTION ENGINE

CROSS-REFERENCE TO RELATED PATENT APPLICATION

This application claims the benefit of Korean Patent Application No. 10-2018-0004447, filed on Jan. 12, 2018, in the Korean Intellectual Property Office, the disclosure of which is incorporated herein in its entirety by reference.

BACKGROUND

1. Field

The present invention relates to a piston for an internal combustion engine and, more particularly, to a piston for an internal combustion engine, which reciprocates in a cylinder of the internal combustion engine to receive a high-temperature and high-pressure explosion pressure in a combustion stroke and transfer power through a connecting rod to a crankshaft.

2. Description of the Related Art

In general, vehicles obtain a driving force by rotating a crankshaft by using explosive power generated by burning gasoline, diesel, liquefied natural gas, or the like, and include an internal combustion engine (hereinafter referred to as an engine) having a cylinder for compressing and burning a mixture of fuel and air. The engine includes a cylinder block including a plurality of cylinders, a cylinder head provided on the cylinder block to provide combustion chambers, and pistons each mounted in the cylinder to vertically reciprocate in the cylinder and to receive and transfer a high-temperature and high-pressure gas pressure generated by expansion due to explosion, through a connecting rod to a crankshaft.

In this case, a crown of the piston for the internal combustion engine, which includes the combustion chamber, receives a load and a high temperature caused by combustion. As such, the crown of the piston for the internal combustion engine includes a cooling channel for cooling the crown, and the cooling channel has an elliptic shape having regular rounded corners.

SUMMARY

In the above-described general piston for the internal combustion engine, when an engine output is increased, the crown including the combustion chamber is exposed to a higher temperature and thus the crown is damaged, e.g., cracked, due to heat at a certain temperature or above. For this reason, to increase cooling performance of the crown, the cooling channel is provided closer to an upper surface of the crown.

However, when the cooling channel is close to the crown, although the cooling performance increases, stress is concentrated on an upper side of the cooling channel close to a part receiving a combustion load and a high temperature and thus durability of the piston for the internal combustion engine decreases.

The present invention provides a piston for an internal combustion engine, the piston being capable of maximizing a stress distribution effect by forming a stress concentration corner of a cooling channel in an elliptical round shape. However, the scope of the present invention is not limited thereto.

According to an aspect of the present invention, there is provided a piston for an internal combustion engine, the piston including a body including, at an upper part of the body, a crown including a combustion chamber where fuel is burnt and including, at a lower part of the body, a piston pin boss into which a piston pin is inserted and a skirt corresponding to a cylinder wall, and a cooling channel including a refrigerant channel provided in the body to allow a refrigerant to flow therethrough to cool the body, a refrigerant inlet provided at a side of the refrigerant channel, and a refrigerant outlet provided at the other side of the refrigerant channel, wherein a cross section of the cooling channel has an overall elliptic shape to reduce stress occurring at an upper side of the cooling channel when the fuel is burnt in the internal combustion engine, and at least one of arcs of the ellipse is configured as a first elliptical arc of a quadratic curve.

A first major axis corresponding to a line segment on an axis connecting two focal points of the first elliptical arc may be provided in a length direction of the ellipse, and a first minor axis corresponding to a line segment perpendicular to the axis connecting the two focal points may be provided in a width direction of the ellipse.

A ratio of the first minor axis to the first major axis of the first elliptical arc may be 60% to 65%.

A ratio of the first minor axis to a width of the ellipse may be 55% to 60%.

In the cooling channel, at least one of the arcs of the ellipse may be configured as a second elliptical arc of a quadratic curve, the second elliptical arc having a second major axis different from the first major axis and a second minor axis different from the first minor axis.

The upper side of the cooling channel may be provided higher than a top ring groove located at a highest position among ring grooves in an outer circumferential surface of the crown.

A distance from the upper surface of the crown to the upper side of the cooling channel may be 7 mm to 9 mm.

The piston may further include an oil groove recessed in a height direction of the body near the refrigerant inlet or the refrigerant outlet at a part where the piston pin boss is connected to the skirt.

At least one of a lower inner circumferential corner and a lower outer circumferential corner of the oil groove may be configured as a third elliptical arc of a quadratic curve to reduce stress occurring near the refrigerant inlet and the refrigerant outlet when the fuel is burnt in the internal combustion engine.

A ratio of a third minor axis to a third major axis of the third elliptical arc may be 75% to 85%.

The piston may further include a reinforced part having a shape of a fourth elliptical arc of a quadratic curve and provided at a lower surface of the crown and a part where the piston pin boss is connected to the skirt.

A ratio of a fourth minor axis to a fourth major axis of the fourth elliptical arc may be 55% to 60%.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
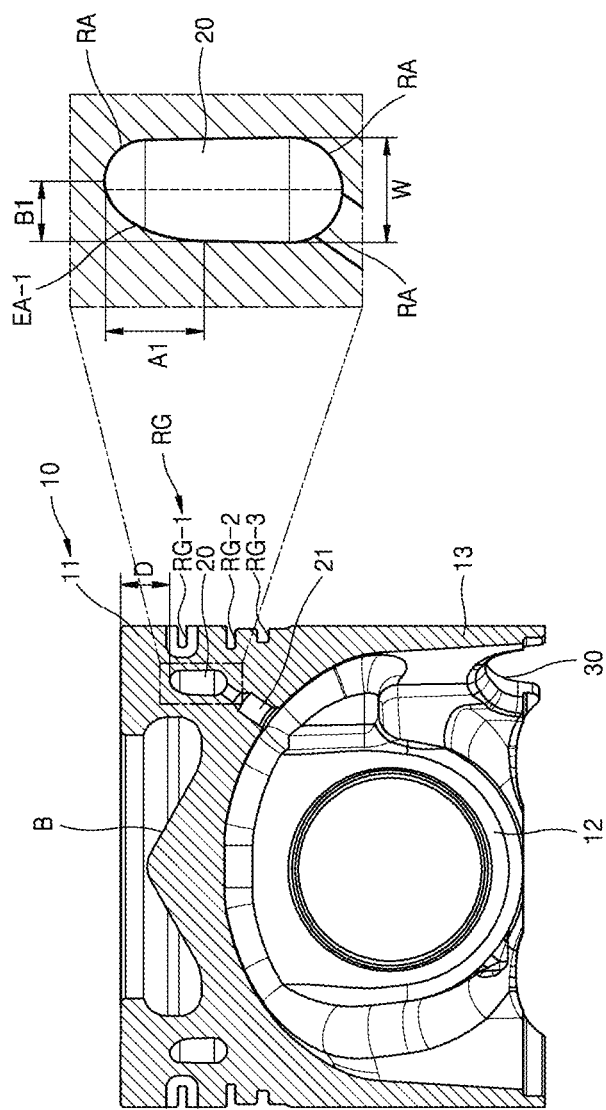
FIG. 1 is a cross-sectional view of a piston for an internal combustion engine, according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thickness or sizes of layers may be exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 2:
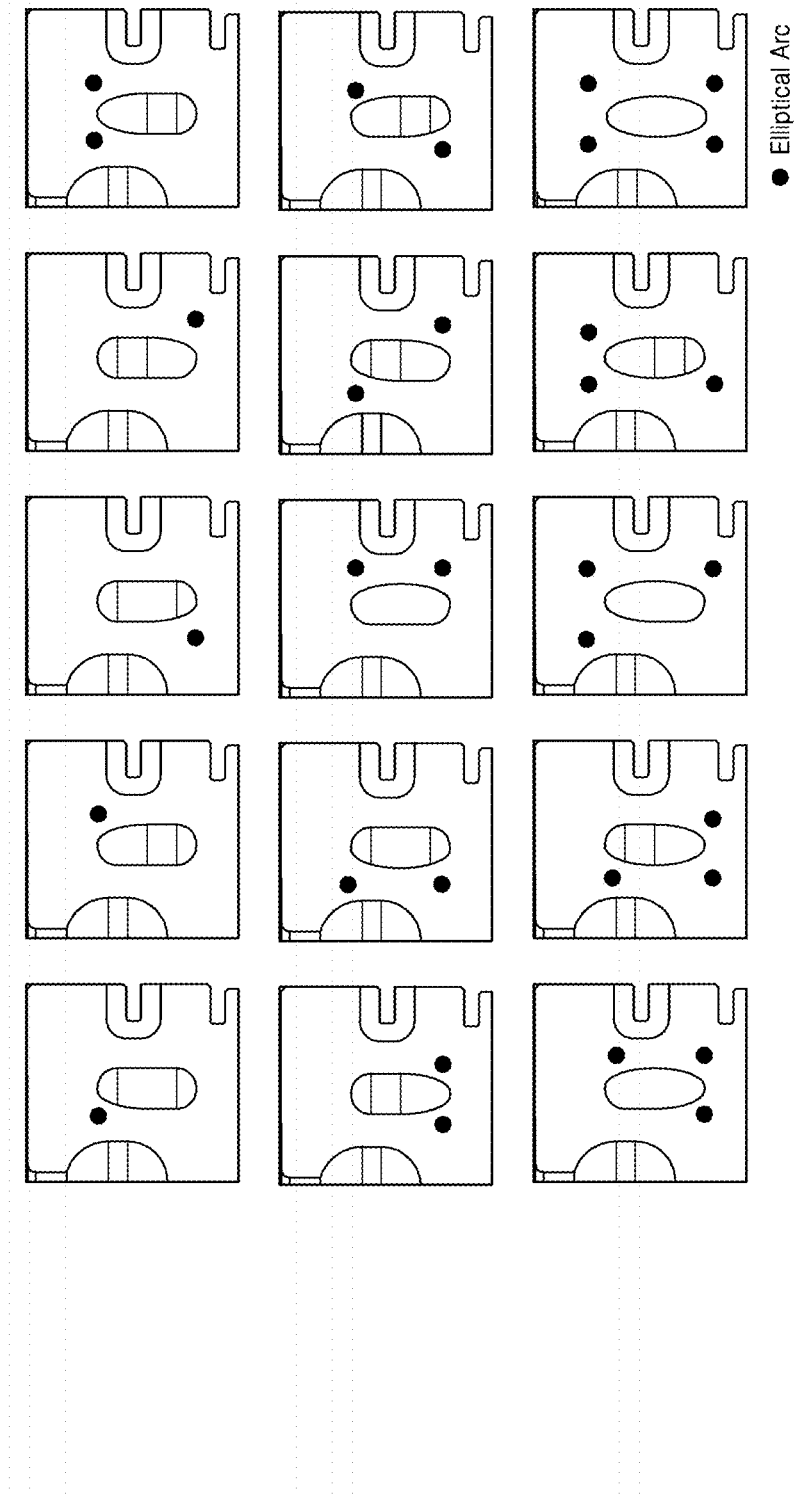
FIG. 2 includes cross-sectional views of various examples of a cooling channel of the piston of FIG. 1.

FIG. 1 is a cross-sectional view of a piston for an internal combustion engine, according to an embodiment of the present invention, and FIG. 2 includes cross-sectional views of various examples of a cooling channel 20 of the piston of FIG. 1.

Initially, as illustrated in FIG. 1, the piston according to an embodiment of the present invention may mainly include a body 10, a cooling channel 20, and an oil groove 30.

As illustrated in FIG. 1, the body 10 may include, at an upper part of the body, a crown 11 including a combustion chamber B where fuel is burnt, and include, at a lower part of the body, a piston pin boss 12 into which a piston pin is inserted and a skirt 13 corresponding to a cylinder wall.

Specifically, the body 10 may include the crown 11, the piston pin boss 12, and the skirt 13 and may be integrally casted with steel or aluminum. The body 10 may prevent leakage of gas and oil from a cylinder of the internal combustion engine and prevent damage of the cylinder wall and the skirt 13 of the body 10 due to friction, and may use a large variety of materials which are light, resistant against a high pressure, and hardly expandable at a high temperature.

The combustion chamber B having a bowl shape may be provided in an upper surface of the crown 11 of the body 10, and a plurality of ring grooves RG into which piston rings (not shown) are inserted may be provided in an outer circumferential surface of the crown 11. A clearance is present between the piston and the cylinder of the internal combustion engine, and may be sealed by the piston rings inserted into the ring grooves RG.

For example, the ring grooves RG may include a top ring groove RG-1, a second ring groove RG-2, and an oil ring groove RG-3. Compression piston rings may be inserted into the top ring groove RG-1 and the second ring groove RG-2, and an oil piston ring may be inserted into the oil ring groove RG-3. The compression piston ring of the top ring groove RG-1 may seal the gas of the combustion chamber B, the oil piston ring of the oil ring groove RG-3 may scrape down the oil on the cylinder wall, and the compression piston ring of the second ring groove RG-2 may seal the gas and, at the same time, control the thickness of an oil film on the cylinder wall.

The piston pin boss 12 of the body 10 may be provided to insert a piston pin (not shown) thereinto. The piston pin is a pin for connecting the piston pin boss 12 to a small end of a connecting rod (not shown), and may transfer a large force received by the piston, through the connecting rod to a crankshaft and, at the same time, reciprocate in the cylinder at a high speed together with the piston.

The skirt 13 of the body 10 may be provided at a side of the body 10 to correspond to the wall of the cylinder of the internal combustion engine. The skirt 13 may guide the piston to smoothly reciprocate in the cylinder and transfer a lateral pressure applied to the piston, to the cylinder wall. In this case, when the skirt 13 has a sufficient length, piston slap occurring when the direction of motion of the piston is switched may be minimized.

As illustrated in FIG. 1, the cooling channel 20 may include a refrigerant channel provided in the body 10 to allow a refrigerant to flow therethrough to cool the body 10, a refrigerant inlet 21 provided at a side of the refrigerant channel, and a refrigerant outlet 22 provided at the other side of the refrigerant channel. In this case, a cross section of the cooling channel 20 may have a substantially elliptic shape to reduce stress occurring at an upper side of the cooling channel 20 when fuel is burnt in the internal combustion engine, and at least one of the arcs of the ellipse may be configured as a first elliptical arc EA-1 of a quadratic curve.

Specifically, a first major axis A1 corresponding to a line segment on an axis connecting two focal points of the first elliptical arc EA-1 may be provided in a length direction of the ellipse, and a first minor axis B1 corresponding to a line segment perpendicular to the axis connecting the two focal points may be provided in a width W direction of the ellipse.

In this case, a ratio of the first minor axis B1 to the first major axis A1 of the first elliptical arc EA-1 may be 60% to 65%, and a ratio of the first minor axis B1 to the width W of the ellipse may be 55% to 60%. The upper side of the cooling channel 20 may be provided higher than the top ring groove RG-1 located at the highest position among the ring grooves RG in the outer circumferential surface of the crown 11, and a distance D from the upper surface of the crown 11 to the upper side of the cooling channel 20 may be 7 mm to 9 mm.

For example, as illustrated in FIG. 1, the cross section of the cooling channel 20 may have a substantially elliptic shape, and one of the arcs close to the combustion chamber B of the crown 11 may be configured as the first elliptical arc EA-1 having an elliptical round shape and the other arcs may be configured as round arcs RA having a regular rounded shape.

Specifically, the width W of the ellipse may be 4.3 mm, the first major axis A1 of the first elliptical arc EA-1 may be 4.1 mm, and the first minor axis B1 of the first elliptical arc EA-1 may be 2.5 mm. As such, the first minor axis B1 of the first elliptical arc EA-1 may have a ratio of 58% of the width W of the ellipse and have a ratio of 60% of the first major axis A1.

Accordingly, by forming a stress concentration corner of the cooling channel 20 in an elliptical round shape, a stress distribution effect may be maximized compared to a general cooling channel including a stress concentration corner having a regular round shape. In this case, the shape of the cooling channel 20 is not limited to that illustrated in FIG. 1. In addition to or instead of the stress concentration corner, at least one of the arcs of the ellipse of the cooling channel 20 may have an elliptical round shape as illustrated in FIG. 2.

Therefore, the piston according to an embodiment of the present invention may maximize cooling performance of the cooling channel 20 and, at the same time, increase a safety factor by forming the cooling channel 20 as close as possible to the upper surface of the crown 11 without greatly changing an overall shape of the cooling channel 20 or reducing a height of the cooling channel 20.

Figure 3:
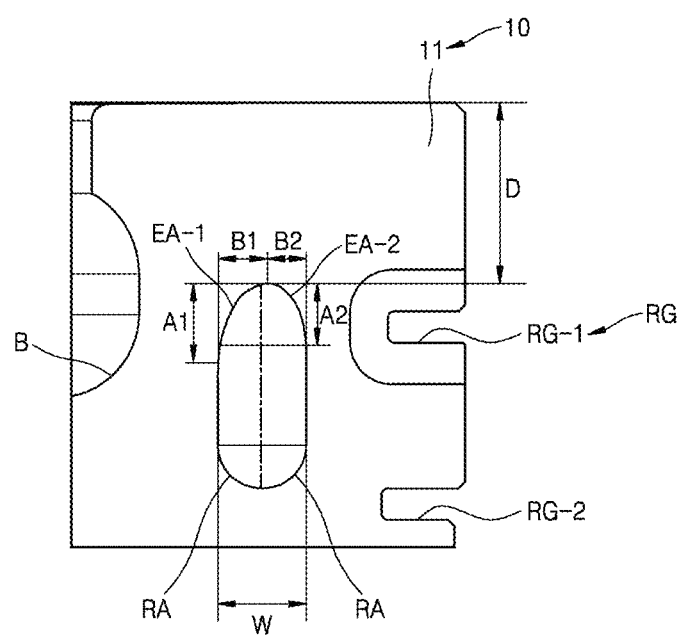
FIG. 3 is a cross-sectional view of the cooling channel of a piston for an internal combustion engine, according to another embodiment of the present invention.

FIG. 3 is a cross-sectional view of the cooling channel 20 of a piston for an internal combustion engine, according to another embodiment of the present invention.

As illustrated in FIG. 3, in the cooling channel 20 of the piston according to another embodiment of the present invention, at least one of the arcs of the ellipse may be configured as a second elliptical arc EA-2 of a quadratic curve, the second elliptical arc EA-2 having a second major axis A2 different from the first major axis A1 and a second minor axis B2 different from the first minor axis B1.

For example, a cross section of the cooling channel 20 may have a substantially elliptic shape, one of the arcs close to the combustion chamber B of the crown 11 may be configured as the first elliptical arc EA-1 having an elliptical round shape, and another of the arcs facing the first elliptical arc EA-1 with respect to a principal axis of the ellipse may be configured as the second elliptical arc EA-2 of a quadratic curve and having the second major axis A2 and the second minor axis B2 different from the first major axis A1 and the first minor axis B1 of the first elliptical arc EA-1. The other arcs at a lower side of the cooling channel 20 may be configured as round arcs RA having a regular round shape.

Thus, by forming a stress concentration corner of the cooling channel 20 in an elliptical round shape, the piston according to another embodiment of the present invention may maximize a stress distribution effect compared to a general cooling channel including a stress concentration corner having a regular round shape. In addition, by forming another corner of the cooling channel 20 facing the stress concentration corner and close to the ring grooves RG, in an elliptical round shape, stress due to a pressure applied from the ring grooves RG may also be easily distributed.

Therefore, cooling performance of the cooling channel 20 may be maximized and, at the same time, a safety factor may be increased by forming the cooling channel 20 as close as possible to the upper surface of the crown 11 without greatly changing an overall shape of the cooling channel 20 or reducing a height of the cooling channel 20.

Figure 4:
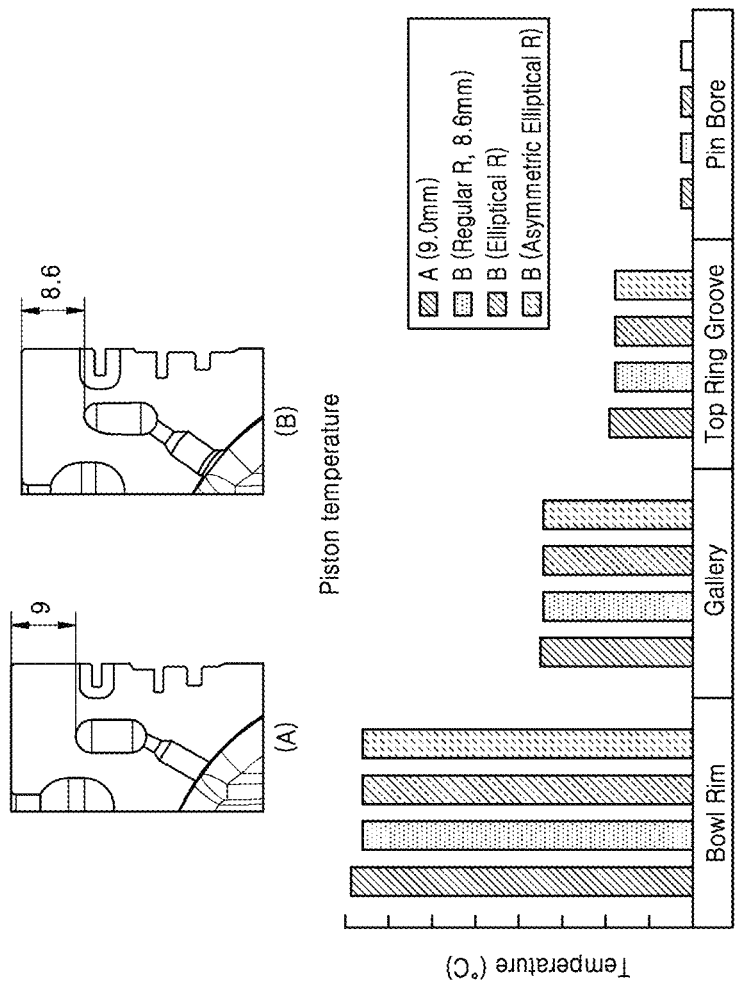
FIGS. 4, 5 and 6 are graphs showing stress analysis results of the cooling channel of a piston for an internal combustion engine, according to an embodiment of the present invention.
Figure 5:
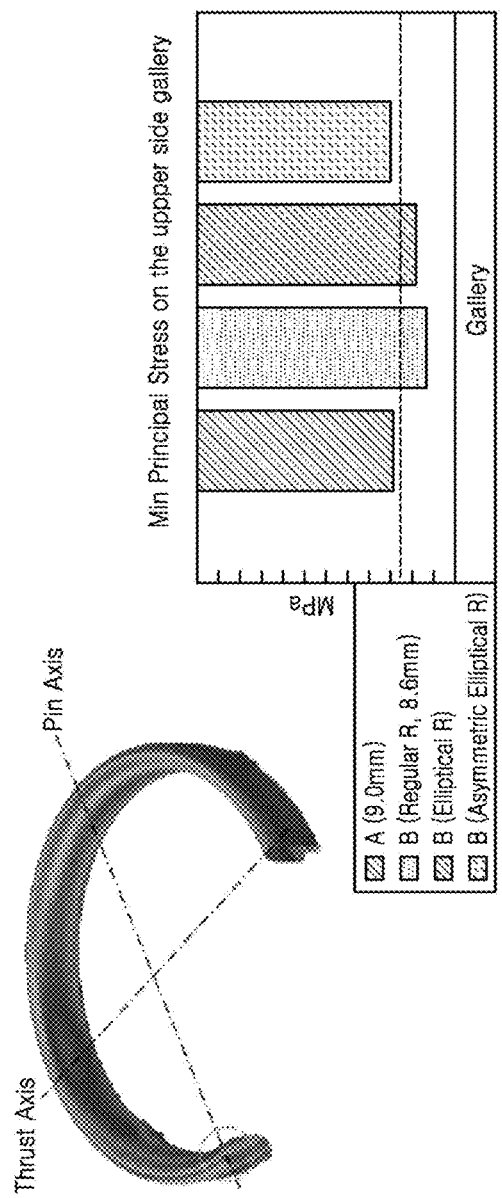
Figure 6:
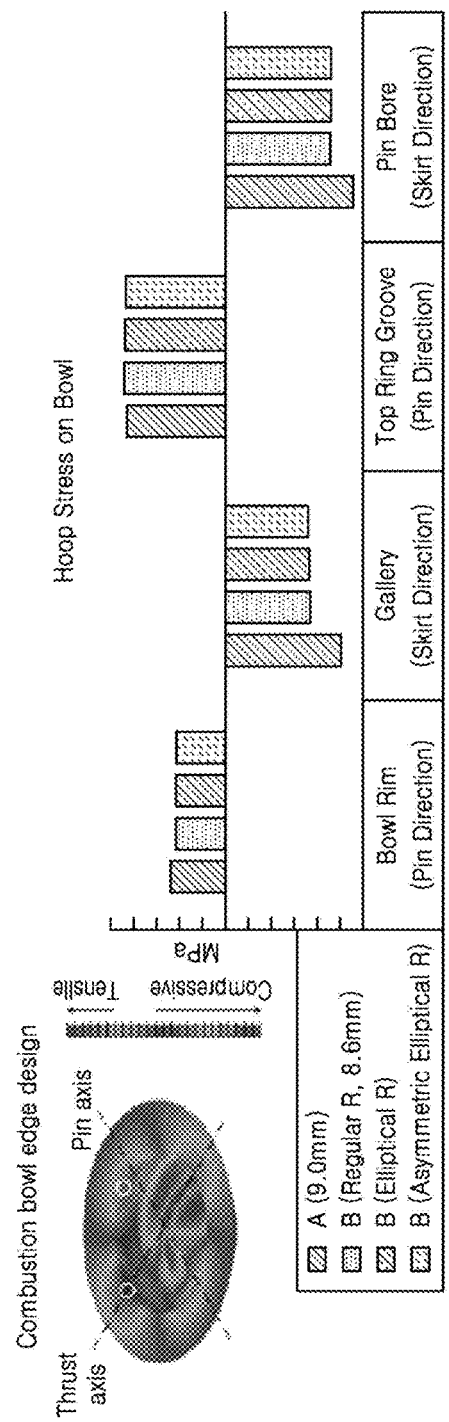

FIGS. 4 to 6 are graphs showing stress analysis results of the cooling channel 20 of a piston for an internal combustion engine, according to an embodiment of the present invention.

FIG. 4 shows that, when a distance from the upper surface of the crown 11 to the upper side of the cooling channel 20, e.g., 9 mm, in a general piston for an internal combustion engine as illustrated in (A) of FIG. 4 is reduced to 8.6 mm as illustrated in (B) of FIG. 4 to reduce a piston temperature, a temperature of the combustion chamber B of the crown 11 is reduced by about 5.2° C. from 397.3° C. to 392.1° C. FIG. 4 also shows that, when the temperature of the combustion chamber B is reduced, temperatures of the cooling channel 20, the ring grooves RG, and the piston pin boss 12 are reduced by about 1° C. to 2° C.

FIG. 4 also shows that, assuming that the distance from the upper surface of the crown 11 to the upper side of the cooling channel 20 is maintained at 8.6 mm, when a corner of the cooling channel 20 has an elliptical round shape as in the cooling channel 20 according to an embodiment or another embodiment of the present invention, a similar temperature reduction effect is achieved.

FIG. 5 show that, when the cooling channel 20 is provided close to the upper surface of the crown 11 to reduce a temperature of the piston, stress of the upper side of the cooling channel 20 is increased. For example, it is shown that, when the distance from the upper surface of the crown 11 to the upper side of the cooling channel 20 is reduced from 9 mm to 8.6 mm, stress applied to the upper side of the cooling channel 20 is increased by about 15%.

However, assuming that the distance from the upper surface of the crown 11 to the upper side of the cooling channel 20 is 8.6 mm, compared to a case when two facing corners at the upper side of the cooling channel 20 have a regular round shape, the stress applied to the upper side of the cooling channel 20 is reduced by about 5% when the two facing corners have a symmetric elliptical round shape, and is reduced to a level similar to that of the case of 9.0 mm when the two facing corners have an asymmetric elliptical round shape as in the cooling channel 20 according to an embodiment or another embodiment of the present invention.

As such, FIG. 6 shows that, when the shape of the cooling channel 20 is optimized as described above, compared to a general case, hoop stress of the combustion chamber B of the crown 11 in a piston pin direction is reduced by about 12% and hoop stress in a direction toward the skirt 13 is reduced by about 28%.

Accordingly, by forming at least one corner of the cooling channel 20 in an elliptical round shape, a stress distribution effect may be maximized compared to a general cooling channel including a stress concentration corner having a regular round shape. As such, cooling performance of the cooling channel 20 may be maximized and, at the same time, a safety factor may be increased by forming the cooling channel 20 as close as possible to the upper surface of the crown 11 without greatly changing an overall shape of the cooling channel 20 or reducing a height of the cooling channel 20.

Figure 7:
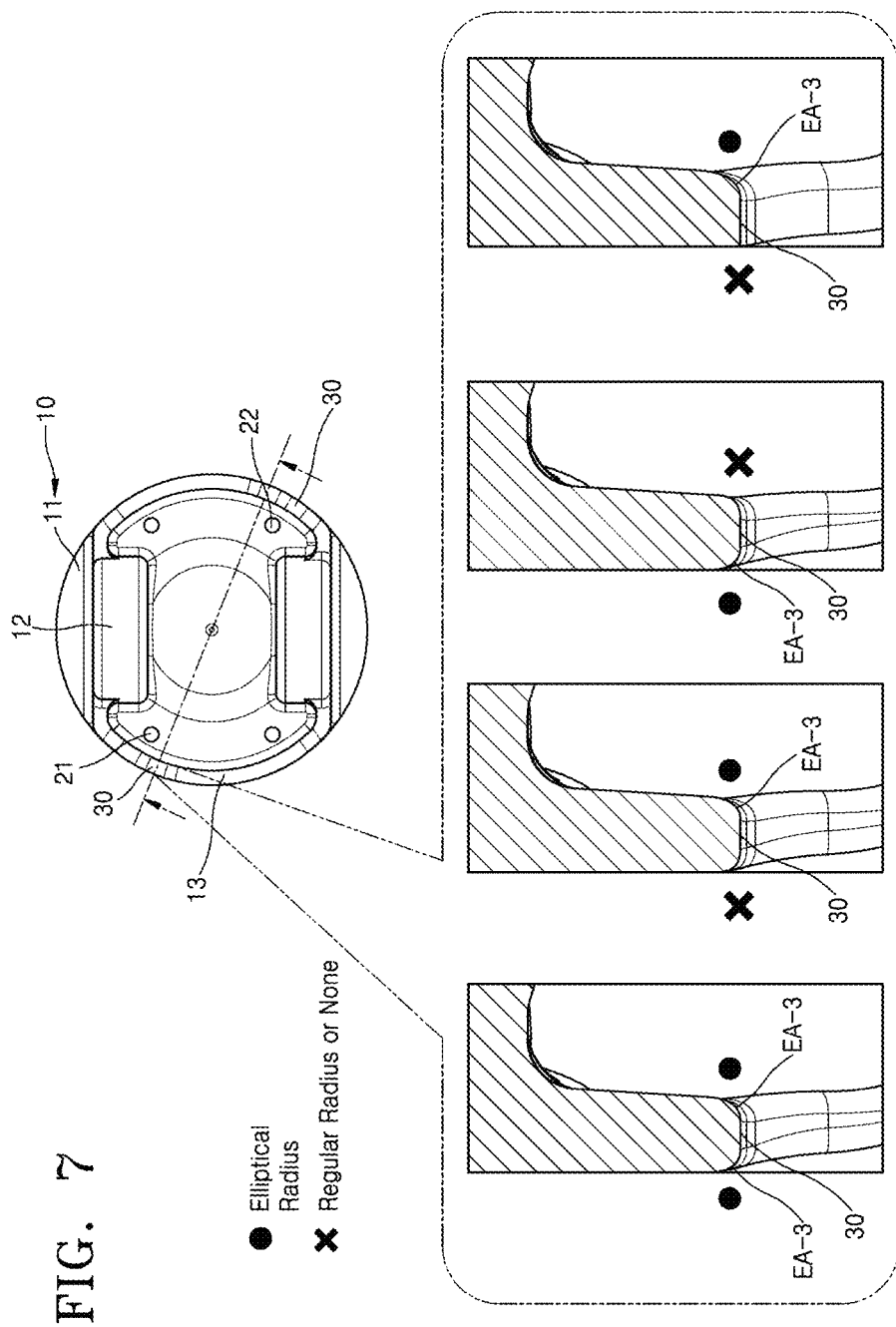
FIG. 7 includes cross-sectional views of an oil groove of a piston for an internal combustion engine, according to an embodiment of the present invention.
Figure 8:
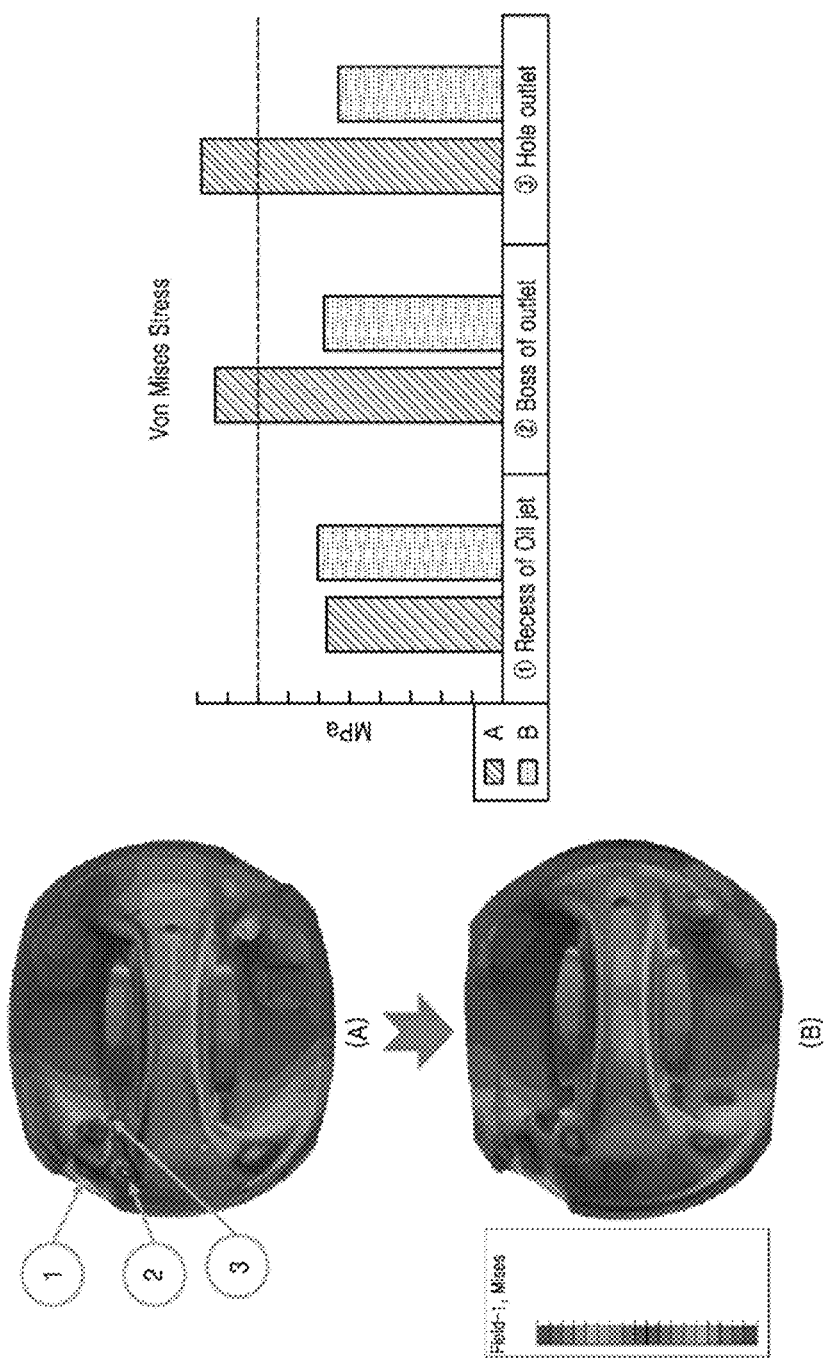
FIG. 8 is a graph showing a stress analysis result of the oil groove of the piston for the internal combustion engine, according to an embodiment of the present invention.

FIG. 7 includes cross-sectional views of the oil groove 30 of a piston for an internal combustion engine, according to an embodiment of the present invention, and FIG. 8 is a graph showing a stress analysis result of the oil groove 30 of the piston for the internal combustion engine, according to an embodiment of the present invention.

As illustrated in FIG. 7, the piston according to an embodiment of the present invention may further include the oil groove 30 recessed in a height direction of the body 10 near the refrigerant inlet 21 or the refrigerant outlet 22 at a part where the piston pin boss 12 is connected to the skirt 13. Specifically, the oil groove 30 may be a groove recessed to prevent the piston from colliding with a refrigerant injection nozzle for injecting a refrigerant into the refrigerant inlet 21 when the piston moves down the cylinder.

In this case, as illustrated in FIG. 7, at least one of a lower inner circumferential corner and a lower outer circumferential corner of the oil groove 30 may be configured as a third elliptical arc EA-3 of a quadratic curve to reduce stress occurring near the refrigerant inlet 21 and the refrigerant outlet 22 when fuel is burnt in the internal combustion engine.

Specifically, overall strength of the piston may be reduced due to the oil groove 30 recessed to avoid the refrigerant injection nozzle when the piston moves down. To prevent the reduction in the strength, at least one of the lower inner circumferential corner and the lower outer circumferential corner of the oil groove 30 may be configured as the third elliptical arc EA-3 having an elliptical round shape to reinforce the strength of the piston.

For example, a ratio of a third minor axis B3 to a third major axis A3 of the third elliptical arc EA-3 may be 75% to 85%. Specifically, the third minor axis B3 of the third elliptical arc EA-3 may be 2.5 mm and the third major axis A3 of the third elliptical arc EA-3 may be 3.15 mm, such that the ratio of the third minor axis B3 to the third major axis A3 may be about 80%.

As such, FIG. 8 shows that, by optimizing the shape of the oil groove 30 near the refrigerant inlet 21 and the refrigerant outlet 22, compared to a general piston including the oil groove 30 not having an elliptical round shape, ② stress of a boss of outlet (thrust) is reduced by about 30% and ③ stress of a hole of outlet (thrust) is reduced by about 35% near the refrigerant inlet 21.

Accordingly, by forming not only the stress concentration corner of the cooling channel 20 but also a vulnerable part of the piston, e.g., the oil groove 30, in an elliptical round shape, overall strength of the piston may be increased compared to a general piston including corners having a regular round shape or a rectangular shape. As such, cooling performance of the piston may be maximized and, at the same time, a safety factor may be increased.

Figure 9:
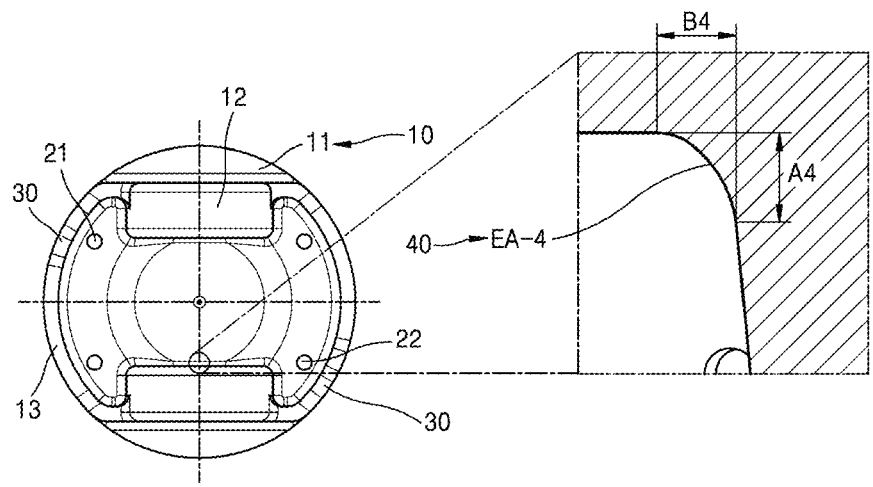
FIG. 9 is a cross-sectional view of a reinforced part of a piston for an internal combustion engine, according to an embodiment of the present invention.
Figure 10:
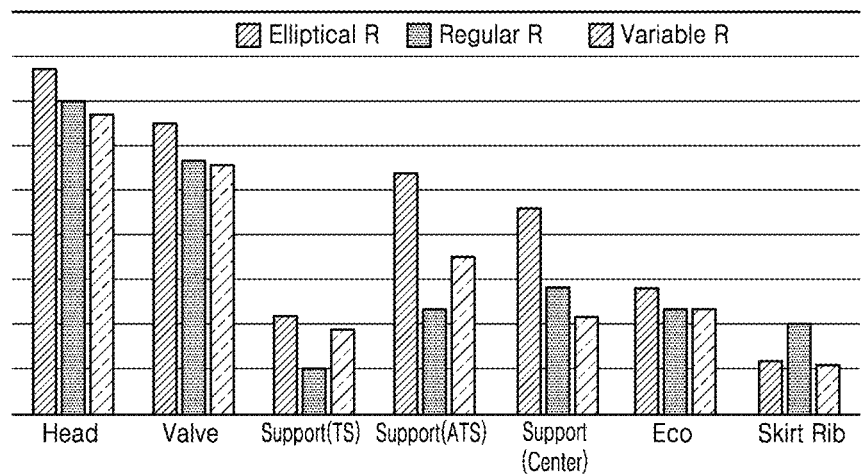
FIG. 10 is a graph showing safety factors of major parts of the piston for the internal combustion engine based on application of the reinforced part, according to an embodiment of the present invention.

FIG. 9 is a cross-sectional view of a reinforced part 40 of a piston for an internal combustion engine, according to an embodiment of the present invention, and FIG. 10 is a graph showing safety factors of major parts of the piston for the internal combustion engine based on application of the reinforced part 40, according to an embodiment of the present invention.

As illustrated in FIG. 9, the piston according to an embodiment of the present invention may further include the reinforced part 40 having a fourth elliptical arc EA-4 shape of a quadratic curve and provided at a lower surface of the crown 11 and a part where the piston pin boss 12 is connected to the skirt 13, to reinforce the lower surface of the crown 11, the part where the piston pin boss 12 is connected to the skirt 13, and overall strength of the piston.

In this case, as illustrated in FIG. 9, to effectively reinforce the lower surface of the crown 11 and the part where the piston pin boss 12 is connected to the skirt 13, a ratio of a fourth minor axis B4 to a fourth major axis A4 of the fourth elliptical arc EA-4 of the reinforced part 40 may be 55% to 60%. Specifically, the fourth minor axis B4 of the fourth elliptical arc EA-4 may be 4 mm and the fourth major axis A4 of the fourth elliptical arc EA-4 may be 7 mm, such that the ratio of the fourth minor axis B4 to the fourth major axis A4 may be about 57%.

As such, FIG. 10 shows that, by forming the reinforced parts 40 in the fourth elliptical arc EA-4 shape at the lower surface of the crown 11 and the part where the piston pin boss 12 is connected to the skirt 13, an overall safety factor of the piston is increased compared to a general piston including reinforced parts having a regular round shape. Particularly, it is shown that a safety factor of the crown (or head) 11 where cracks most frequently occur among parts of the piston is 1.60 when the reinforced parts 40 have a regular round shape and is increased to 1.67 when the reinforced parts 40 have the fourth elliptical arc EA-4 shape.

Accordingly, by forming not only the stress concentration corner of the cooling channel 20 but also the reinforced parts 40 at vulnerable parts of the piston, e.g., the lower surface of the crown 11 and the part where the piston pin boss 12 is connected to the skirt 13, in an elliptical round shape, overall strength of the piston may be increased compared to a general piston including the reinforced parts 40 having a regular round shape. As such, cooling performance of the piston may be maximized and, at the same time, a safety factor may be increased.

As described above, according to an embodiment of the present invention, by forming a stress concentration corner of a cooling channel in an elliptical round shape, a stress distribution effect may be maximized compared to a general cooling channel including a stress concentration corner having a regular round shape.

As such, a piston for an internal combustion engine, the piston being capable of forming a cooling channel as close as possible to an upper surface of a crown and increasing a safety factor without greatly changing an overall shape of the cooling channel or reducing a height of the cooling channel may be implemented. However, the scope of the present invention is not limited to the above-described effect.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A piston for an internal combustion engine, the piston comprising:
   a body comprising, at an upper part of the body, a crown comprising a combustion chamber where fuel is burnt and comprising, at a lower part of the body, a piston pin boss into which a piston pin is inserted and a skirt corresponding to a cylinder wall;
   a cooling channel comprising a refrigerant channel provided in the body to allow a refrigerant to flow therethrough to cool the body, a refrigerant inlet provided at a side of the refrigerant channel, and a refrigerant outlet provided at the other side of the refrigerant channel; and
   a reinforced part having a shape of a fourth elliptical arc of a quadratic curve and provided at a lower surface of the crown and a part where the piston pin boss is connected to the skirt,
   wherein a cross section of the cooling channel has an overall elliptic shape to reduce stress occurring at an upper side of the cooling channel when the fuel is burnt in the internal combustion engine, and at least one of arcs of the ellipse is configured as a first elliptical arc of a quadratic curve, and wherein a ratio of a fourth minor axis to the fourth major axis of the fourth elliptical arc is 55% to 60%.

2. The piston of claim 1, wherein a first major axis corresponding to a line segment on an axis connecting two focal points of the first elliptical arc is provided in a length direction of the ellipse, and a first minor axis corresponding to a line segment perpendicular to the axis connecting the two focal points is provided in a width direction of the ellipse.

3. The piston of claim 2, wherein a ratio of the first minor axis to the first major axis of the first elliptical arc is 60% to 65%.

4. The piston of claim 2, wherein a ratio of the first minor axis to a width of the ellipse is 55% to 60%.

5. The piston of claim 2, wherein, in the cooling channel, at least one of the arcs of the ellipse is configured as a second elliptical arc of a quadratic curve, the second elliptical arc having a second major axis different from the first major axis and a second minor axis different from the first minor axis.

6. The piston of claim 1, wherein the upper side of the cooling channel is provided higher than a top ring groove located at a highest position among ring grooves in an outer circumferential surface of the crown.

7. The piston of claim 1, wherein a distance from the upper surface of the crown to the upper side of the cooling channel is 7 mm to 9 mm.

8. The piston of claim 1, further comprising an oil groove recessed in a height direction of the body near the refrigerant inlet or the refrigerant outlet at a part where the piston pin boss is connected to the skirt.

9. The piston of claim 8, wherein at least one of a lower inner circumferential corner and a lower outer circumferential corner of the oil groove is configured as a third elliptical arc of a quadratic curve to reduce stress occurring near the refrigerant inlet and the refrigerant outlet when the fuel is burnt in the internal combustion engine.

10. The piston of claim 9, wherein a ratio of a third minor axis to a third major axis of the third elliptical arc is 75% to 85%.

* * * * *